(12) United States Patent
Shanahan

(10) Patent No.: US 9,158,657 B2
(45) Date of Patent: Oct. 13, 2015

(54) ARCHITECTURE FOR REMOTE ACCESS TO CONTENT STATE

(71) Applicant: Audible, Inc., Newark, NJ (US)

(72) Inventor: Francis Andrew Shanahan, Watchung, NJ (US)

(73) Assignee: Audible, Inc., Newark, NJ (US)

( * ) Notice: Subject to any disclaimer, the term of this patent is extended or adjusted under 35 U.S.C. 154(b) by 199 days.

(21) Appl. No.: 13/770,998

(22) Filed: Feb. 19, 2013

(65) Prior Publication Data

US 2014/0237296 A1   Aug. 21, 2014

(51) Int. Cl.
*G06F 11/00* (2006.01)
*G06F 11/36* (2006.01)

(52) U.S. Cl.
CPC .................. *G06F 11/3624* (2013.01)

(58) Field of Classification Search
USPC ............................................. 714/38.1, 38.14
See application file for complete search history.

(56) References Cited

U.S. PATENT DOCUMENTS

| | | | |
|---|---|---|---|
| 8,788,885 B1* | 7/2014 | Cook et al. ................... | 714/38.1 |
| 8,862,940 B2* | 10/2014 | Qiu et al. ......................... | 714/28 |
| 2008/0052372 A1* | 2/2008 | Weber et al. .................. | 709/217 |
| 2009/0082008 A1* | 3/2009 | Thorell ......................... | 455/423 |
| 2009/0164564 A1 | 6/2009 | Willis | |
| 2011/0154185 A1 | 6/2011 | Kern et al. | |
| 2012/0154195 A1 | 6/2012 | Nystrom et al. | |
| 2012/0324069 A1* | 12/2012 | Nori et al. ..................... | 709/222 |
| 2014/0047413 A1* | 2/2014 | Sheive et al. .................. | 717/110 |
| 2014/0089395 A1* | 3/2014 | Atsatt et al. ................... | 709/203 |
| 2014/0129878 A1* | 5/2014 | Saltzman et al. ............ | 714/38.1 |

OTHER PUBLICATIONS

Google, Inc., "Chrome Developer Tools: Remote Debugging", Apr. 6, 2012, 2 pages, https://developers.google.com/chrome-developer-tools/docs/remote-debugging.

* cited by examiner

*Primary Examiner* — Yolanda L Wilson
(74) *Attorney, Agent, or Firm* — Knobbe Martens Olson & Bear LLP

(57) ABSTRACT

Features are disclosed for facilitating remote access to the state of an application or content item currently executing or rendered on a user computing device. A connection between the user computing device and another computing device (or connections between the user computing device and an intermediary system, and between another computing device and the same intermediary system) may be established according to a bidirectional communication protocol. The user computing device may receive and act on communications from the other computing device, including requests for data regarding the current state of an application or content page on the user computing device, instructions to execute some function in the application or content page, etc. In addition, user computing devices may be grouped such that an application or content may be monitored/tested/debugged among a variety of user computing devices.

30 Claims, 6 Drawing Sheets

ARCHITECTURE FOR REMOTE ACCESS TO CONTENT STATE

BACKGROUND

Client computing devices may be used to request content pages and other network-accessible content from content servers. Content pages can include text, images, videos, animations, and the like. In a typical application, a client device transmits a request for a content page to a content server. The request can be formatted and communicated according to standard protocols understood by both the client computing device and the content server, such as the Hypertext Transfer Protocol ("HTTP"). In response to some requests, the content server can prepare a response in the form of a Hypertext Markup Language ("HTML") document. HTML documents may have embedded references to separate files and objects, such as images, executable code files, and the like. An HTML document may be transmitted to the client computing device in response to an HTTP request. The client computing device can process the HTML document, identify embedded references to separate files and objects, and request those files and objects, e.g., by issuing HTTP requests to the same server or to a different server.

Conventionally, content pages, such as those defined by HTML documents, may be tested and debugged by executing a debugging application on the same computing device that is rendering or executing content to be debugged. For example, a debugging application may launch a browser application to render an HTML file and execute any embedded reference. The debugging application may have access to the state of the browser application during rendering and execution, and can inspect element values, execute instructions, and perform other debugging operations. In some cases, a separate computing device may access the state of a browser application during rendering and execution. For example, a first client computing device may execute a debugging application, and a separate client computing device, connected to the first client computing device via a universal serial bus ("USB") cable or some other direct communication link, may execute a browser application that renders an HTML file. The separate client computing device may be configured to allow the debugging application, running on the first client computing device, to perform debugging operations (read/write program state, execute commands, etc.)

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
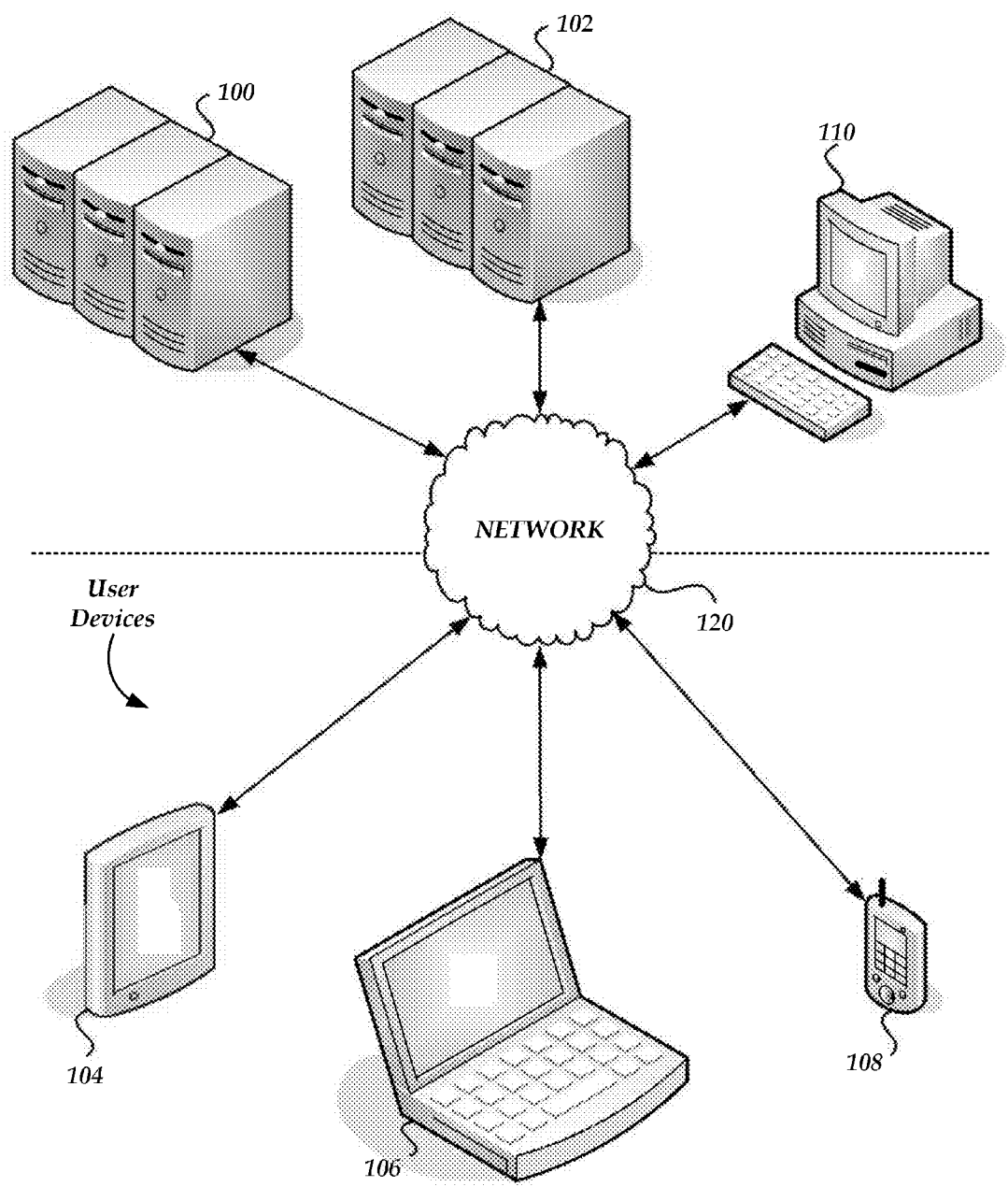
FIG. 1 is a block diagram of an illustrative networked content delivery system including a content server, an administrator computing device, several user computing devices, and an intermediary system.

Access to the state of a software application or electronic content item can be beneficial for a variety of reasons, including but not limited to monitoring execution of the item, debugging the item, dynamically altering the item, and the like. Typically, physical access to a computing device on which the application or content is executing or rendering is needed in order to access the state of the item. For example, a debugging application may be executed on the same computing device as the item to be debugged so that the debugging application can access the execution environment of the item during debugging. However, some computing devices (e.g., mobile phones, tablets, electronic book readers, etc.) have hardware and/or software constraints that make it difficult to access and execute debugging tools, monitoring tools, and the like directly on the computing device itself. In some cases, a separate computing device may be used if there is a direct communication link between the two devices, and if the computing device on which the item to be monitored/debugged/altered (e.g., the user device) is configured to allow the other computing device (e.g., the administrator or debugging device) to access the state of an item executing on the user device. An administrator device is generally unable to access the state of a software application or electronic content executing on a separate user computing device remote from the administrator device (e.g., not directly connected but rather accessible via a public or private network) unless security settings or other configuration settings of the separate user computing device are altered to allow such access.

The present disclosure is directed to facilitating access to the state of applications and electronic content on remote devices. Some aspects of the disclosure will be described with respect to utilizing standard bidirectional communication protocols to communicate with a user computing device remote from an administrator or debugging device, herein referred to as the administrator device. The administrator device need not be directly connected to the user computing device, and the configuration and security settings of the user computing device do not need to be altered to provide the administrator device with access. By using a connection established via a bidirectional communication protocol, the administrator device can send queries, instructions, and other communications to the user computing device without first receiving a request for such communications from the user computing device, as is generally required by other commonly used protocols (e.g., Hypertext Transfer Protocol ("HTTP")). The user device can act upon the communications by submitting a response, altering the state of an item on the user device, or performing some other action.

For example, a content page may be defined by a Hypertext Markup Language ("HTML") file. A user computing device may access and retrieve the HTML file from a content server and then render the content page. The HTML file may be retrieved according to a standard protocol, such as HTTP. The HTML file may include instructions (or a reference to a separate file with instructions) to open a connection to an intermediary system. The intermediary system may be associated with the content server from which the HTML file was retrieved, or it may be independent of the content server. The connection to the intermediary system may be established using a bidirectional communication protocol (e.g., WebSocket) such that the user device may exchange communications with other computing devices without requiring customized configuration or specialized knowledge that is not part of the standard protocol. Using the bidirectional communication protocol, an administrator device may then access the Document Object Model ("DOM") of the content page on the user device via the intermediary system without requiring any alteration to the configuration or security settings of the user computing device. Any DOM content is eligible for such access, including HTML, Cascading Style Sheets ("CSS"), JavaScript, etc. In this way, the administrator device can test or debug the content page on the user computing device remotely, thereby increasing the number and variety of user devices and configurations on which the content page may be tested and debugged by eliminating the need to physically connect to, or otherwise be associated with, the particular user computing devices to be tested.

As used herein, the term "remote" does not necessarily mean that the user device and the administrator device must be in different physical or geographic locations. Rather, remote devices include devices that communicate via a network connection, such as the Internet or a local area network ("LAN"), rather than devices that are directly connected via a wired or wireless connection. While devices in different physical or geographic locations may be remote devices, devices in the same location (e.g., a single room) and devices physically operated by the same user may also be remote devices.

In addition, some bidirectional communication protocols (e.g., WebSocket) allow a user device to exchange communications with a third-party device that is not associated with the currently displayed content item, such as an administrator device in a different domain than the content server from which the content item was retrieved. As a result, a third-party administrator device can monitor content state, debug, and otherwise interact with content on any user device, retrieved from any content server, once a bidirectional connection has been established between the administrator device and the user device. To facilitate such third-party access to content state, a user computing device may establish a connection to an intermediary system in the absence of an instruction in the current content page or in a file referenced by the current content page. For example, user may activate a link or bookmark with executable instructions (e.g., a "bookmarklet") or otherwise execute code that causes the user computing device to establish the connection to the intermediary system. The link or bookmark may not be part of, or may not otherwise be associated with, the current content page or the content server of the current content page. In this way, an administrator device may access the state of any content item executing on a user device without being associated with the content item or the source thereof.

Additional aspects of the present disclosure will be described with respect to testing or debugging multiple remote user computing devices concurrently or substantially concurrently. For example, several separate user computing devices may execute or render a content item and also use a bidirectional communication protocol to establish a connection to an intermediary system. A single administrator device may then, via the intermediary system, access the state of the content item on each of the several user computing devices, either individually or collectively. The user computing devices do not need to be associated with each other or with the administrator device in order to facilitate such access. In some embodiments, the user computing devices may be different types of devices (e.g., laptops, tablets, and mobile phones), with different performance characteristics (e.g., processor speeds, display sizes, input/output capabilities), running different operating systems, internet browser applications, etc. In some embodiments, the user computing devices may be executing or rendering different applications or content items altogether.

Various aspects of the disclosure will now be described with regard to illustrative examples and embodiments. One skilled in the art will appreciate that the disclosed embodiments and examples should not be construed as limiting. Although the illustrated embodiments are described with respect to an administrator device accessing the state of an application or content item executing on a user device in order to monitor or debug the content item, the architecture and methods described herein may be used in other ways. For example, a content item may be transmitted to one or more user devices, which then establish a bidirectional communication connection to an intermediary system. One or more administrator devices (or other devices, such as master user devices) may then dynamically control the content that is executed or displayed on the user device(s) via the intermediary system. In some embodiments, users of the user devices may interact with the dynamic content and submit communications to the administrator/master devices(s) and/or other user devices, further access or alter content on the other devices, and the like.

Networked Content Delivery System

With reference to an illustrative embodiment, FIG. 1 shows a network computing environment in which features for facilitating access to the state of applications and content items executing on one or more remote devices may be implemented. The network computing environment can include an intermediary system 100, a content server 102, an administrator computing device 110, and various client computing devices 104, 106 and 108.

The intermediary system 100, content server 102, administrator device 110 and various user devices 104-108 may communicate over a communication network 120. The communication network 120 may be any wired network, wireless network, or combination thereof. In addition, the network 120 may be a personal area network, local area network, wide area network, cable network, satellite network, cellular telephone network, or combination thereof. For example, the communication network 120 may be a publicly accessible network of linked networks, possibly operated by various distinct parties, such as the Internet. In some embodiments, the communication network 120 may be a private or semi private network, such as a corporate or university intranet. The communication network 120 may include one or more wireless networks, such as a Global System for Mobile Communications ("GSM") network, a Code Division Multiple Access ("CDMA") network, a Long Term Evolution ("LTE") network, or some other type of wireless network. Components for communicating via the Internet or any of the other aforementioned types of communication networks are well known to those skilled in the art of computer communications and thus, need not be described in more detail herein.

The user devices 104-108 can correspond to a wide variety of electronic devices. In some embodiments, one or more user devices 104-108 are mobile devices that include one or more processors and a memory which may contain software applications executed by the processors. In addition, the user devices 104-108 may be configured with one or more wireless network antennae or wired ports to facilitate communication with other devices and with the content server 102 and intermediary system 100. The software of the user devices 104-108 may include components for establishing communications over the communication network 120. For example, the user devices 104-108 may include browser applications to retrieve and render network content from the content server 102. User devices 104-108 may include speakers and/or displays for presenting content. In addition, the software applications may include multimedia applications which play or otherwise execute audio programs such as music or audio books, video programs such as movies or television shows, and video games.

As illustrated in FIG. 1, the user devices may include a tablet computing device or electronic book reader 104, a laptop computer 106 or a mobile phone 108. However, those skilled in the art will recognize that user devices may also include, without limitation, tablet computers, personal computers, personal digital assistants ("PDAs"), hybrid PDA/mobile phones, mobile media players, electronic book readers, set-top boxes, cameras, digital media players, video game consoles, kiosks, televisions, gaming devices, processors, integrated components for inclusion in computing devices, appliances, electronic devices for inclusion in vehicles, gaming devices, etc.

The intermediary system 100 illustrated in FIG. 1 may correspond to a computing device or devices configured to manage communications among the user devices 104-108 and the administrator device 110. For example, the intermediary system 100 may include one or more processors and a computer storage or memory which contains software applications or modules executed by the processors. The intermediary system 100 may establish connections with one or more of the user devices 104-108 and the administrator device 110. In response to receiving a communication from the administrator device 110, the intermediary system 100 can determine which of the user devices 104-108 is the intended recipient, and then forward the communication to the appropriate user device(s) 104-108. In response to receiving a communication from a user device 104-108, the intermediary system 100 can forward the communication to the administrator device 110 or some other device as appropriate.

In some embodiments, the intermediary system 100 may correspond to a logical association of one or more computing devices, such as a web server for transmitting network content, maintaining connections and forwarding communications, a database server for tracking data regarding the various user devices and communications, and the like. In some embodiments, the features and services provided by the intermediary system 100 may be implemented as web services consumable via the communication network 120. In further embodiments, the intermediary system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The content server 102 can include a logical association of one or more computing devices for hosting content and servicing requests for the hosted content. For example, the content server 102 can include a web server component corresponding to one or more server computing devices for obtaining and processing requests for content (such as content pages) from a user device.

In some embodiments, the network computing environment may include additional or fewer components that those illustrated in FIG. 1. For example, the network computing environment may include two or more intermediary systems 100 configured for load balancing, redundancy, or to operate independently of each other. As another example, user devices 104-108 may communicate with each other and with the communication network 120 via a LAN. As a further example, the network computing environment may not include a separate content server 102 and intermediary system 100. Rather, the content server 102 and intermediary system 100 may be implemented by a single entity, on a single device or redundant group of devices, etc. As a still further example, the network computing environment may not include a separate intermediary system 100 and administrator device 110. Rather, the intermediary system 100 and administrator device 110 may be implemented on a single device or group of devices, etc. For example, the features of the administrator device and intermediary system described herein may be provided and/or managed by separate processes on a single computing device or group of devices. In some embodiments, the features of the administrator device and intermediary system described herein may be provided and/or managed by a single process or group of processes executing on a single computing device or group of computing devices.

Process for Providing Remote Access to Content State

Figure 2:
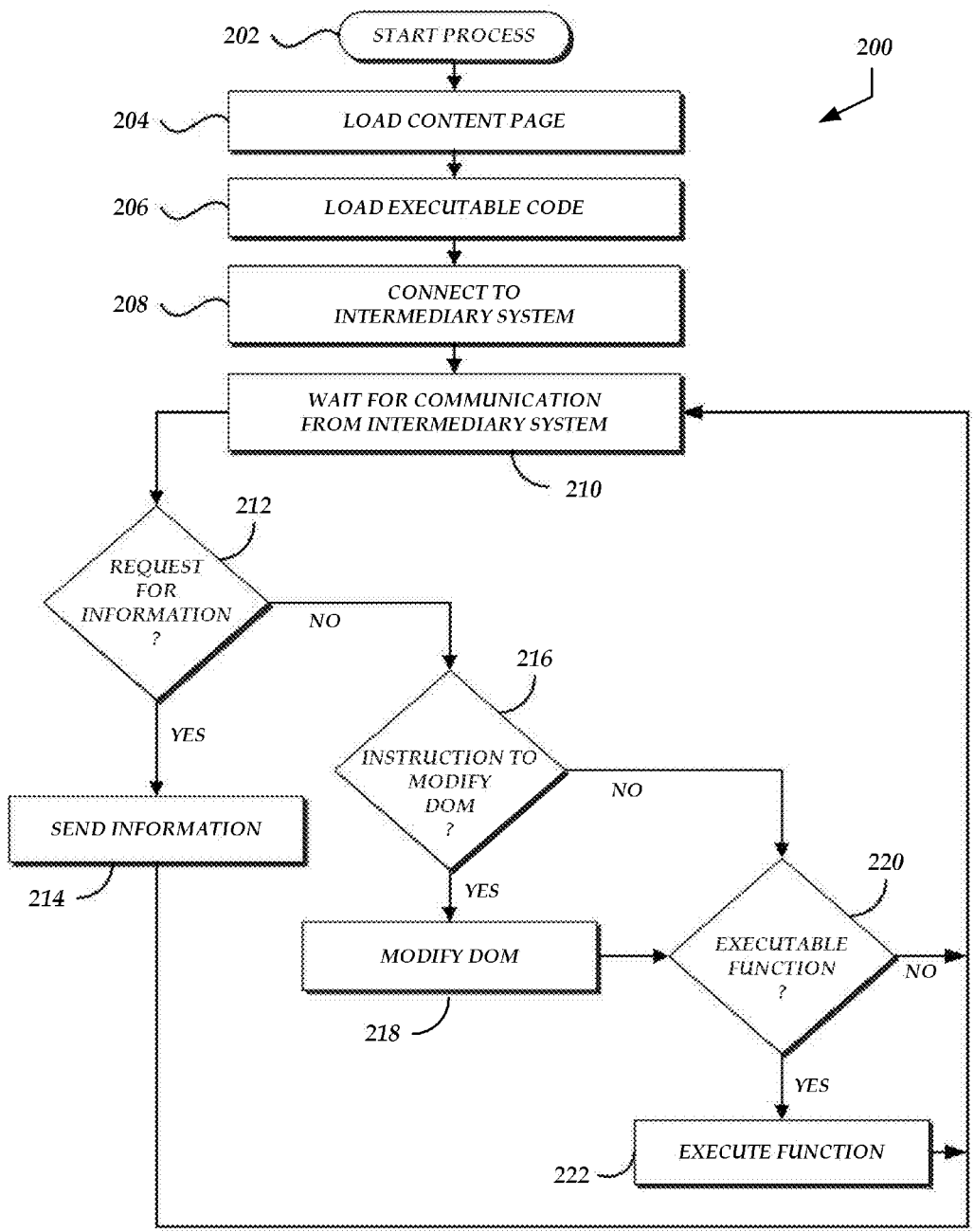
FIG. 2 is a flow diagram of an illustrative process for allowing an administrator computing device to access the state of a content page executing on a remote user computing device.

Turning now to FIG. 2, a sample process 200 for establishing a connection with an intermediary system 100 and providing a remote administrator device 110 with access to the state of a content item rendered on a user device is shown. The connection may be established by using a bidirectional communication protocol, and a library of functions facilitating access to the state of the content item rendered on the user device may be retrieved from a content server 102, the intermediary system 100, or some other source. Advantageously, the library of functions may, for example, implement methods of reading and writing the state of the content page, altering the DOM of the content page, executing instructions, etc. according to standard protocols so that no changes to the configuration or security settings on the user device are needed.

The process 200 begins at block 202. The process 200 may be initiated when a user device, such as the tablet computing device 104 illustrated in FIG. 1, launches a browser application. Although the description which follows focuses on interactions with a tablet computing device 104, the same process 200 or another similar processed may be used for other types of user computing devices, including but not limited to those described above with respect to FIG. 1.

The user device 104 may be connected to the communication network 120, and a user of the user device 104 may use the browser application to request network content from a content server 102. The content request may be transmitted from the user device 104 in the form of an HTTP GET request or a request submitted according to some other standard network protocol known to and agreed on by the user device 104 and the content server 102.

At block 204, the user device 104 can load the requested content page from the content server 102. For example, the content page may be defined by an HTML file with embedded references to other items, such as media items (e.g., images, videos) and other code files (e.g., CSS files, JavaScript libraries). The user device 104 may parse, execute, render, or otherwise process the content page, and may download referenced items and files as it encounters the embedded references during processing.

At block 206, the user device 104 can download executable code to facilitate remote access to content state. The executable code may part of a code file referenced by the HTML file retrieved in block 204. The executable code may include functions and instructions to facilitate access to the state of the content page as it is rendered and during user interaction, such as routines that open a connection to the intermediary system 100, routines that retrieve requested information in response to queries from an administrator device 110, routines that execute instructions received from an administrator device 110, and the like. For example, the HTML file that defines the content page may include a reference to a separate JavaScript file (e.g., <script type="text/javascript" src="http://server102.com/script.js"></script>). When a browser application or other parser on the user device 104 encounters such a reference, the browser can retrieve the file "script.js" from the location "http://server102.com."

In some embodiments, a user may proactively request retrieval of a code file or the user may otherwise cause code to be loaded or executed rather than the user device 104 downloading a code file in response to encountering a reference to the code file during processing of a requested HTML file. For example, the content page may include a link that, when activated by the user, causes the browser to retrieve the "script.js" file. As another example, the link may be a bookmarklet (e.g., "javascript:function openconnection(server) {[JavaScript code ... ]}" where "openconnection" is a newly defined JavaScript function to open a connection to an intermediary system 100 and obtain the "script.js" file) or some similar element that causes code to be executed or loads executable code into memory.

At block 208, the user device can connect to the intermediary system 100. The code referenced by the HTML file may include instructions that, when executed, causes the user device to establish a connection to the intermediary system 100. For example, the instructions may establish a bidirectional connection (e.g., a WebSocket connection) to a particular intermediary system 100 that may or may not be associated with the content server 102 from which the currently displayed content page was retrieved. Advantageously, establishment of a bidirectional connection permits the user device to receive unprompted communications from other devices (e.g., an administrator device 110) via the intermediary system 100 even though the user device 104 proactively established the connection with the intermediary system 100. Other types of connections, such as those established using HTTP, generally do not permit such bidirectional communication (e.g., they do not permit a server or other device to transmit queries, instructions, or other communications to a user device 104 without first receiving a request from the user device 104 for the communication or data).

At block 210, the user device 104 can wait to receive a communication from an administrator device 110 via the intermediary system 100. During this time, the user device 104 can proceed to render and execute the current content page, respond to user interactions, and the like. When a communication is received from the administrator device 110 (via the intermediary system 100) over the bidirectional connection established in block 208, the process 200 may proceed to decision block 212.

At decision block 212, the user device 104 can determine whether the communication received from the administrator device 110 is a request for information. If not, the process 200 can proceed to decision block 216. If the communication is a request for information, the user device 104 can obtain the requested information and transmit it to the administrator device 110 (via the intermediary system 100) at block 214.

For example, a user of the administrator device 110 may wish to determine to the currently displayed value in a particular element of a content page rendered on the user device 104. As another example, the user of the administrator device 110 may wish to determine whether a particular element is visible prior to altering its contents. The administrator device 110 may transmit a communication requesting such information according to a particular predetermined format that will be understood by the user device 104 (e.g., the administrator device 100 may transmit function call that invokes a routine defined in the executable code file retrieved by the user device 104 in block 206). Upon receipt of the communication, the corresponding routine defined in the downloaded code file may be invoked to respond to the request for information.

Figure 3:
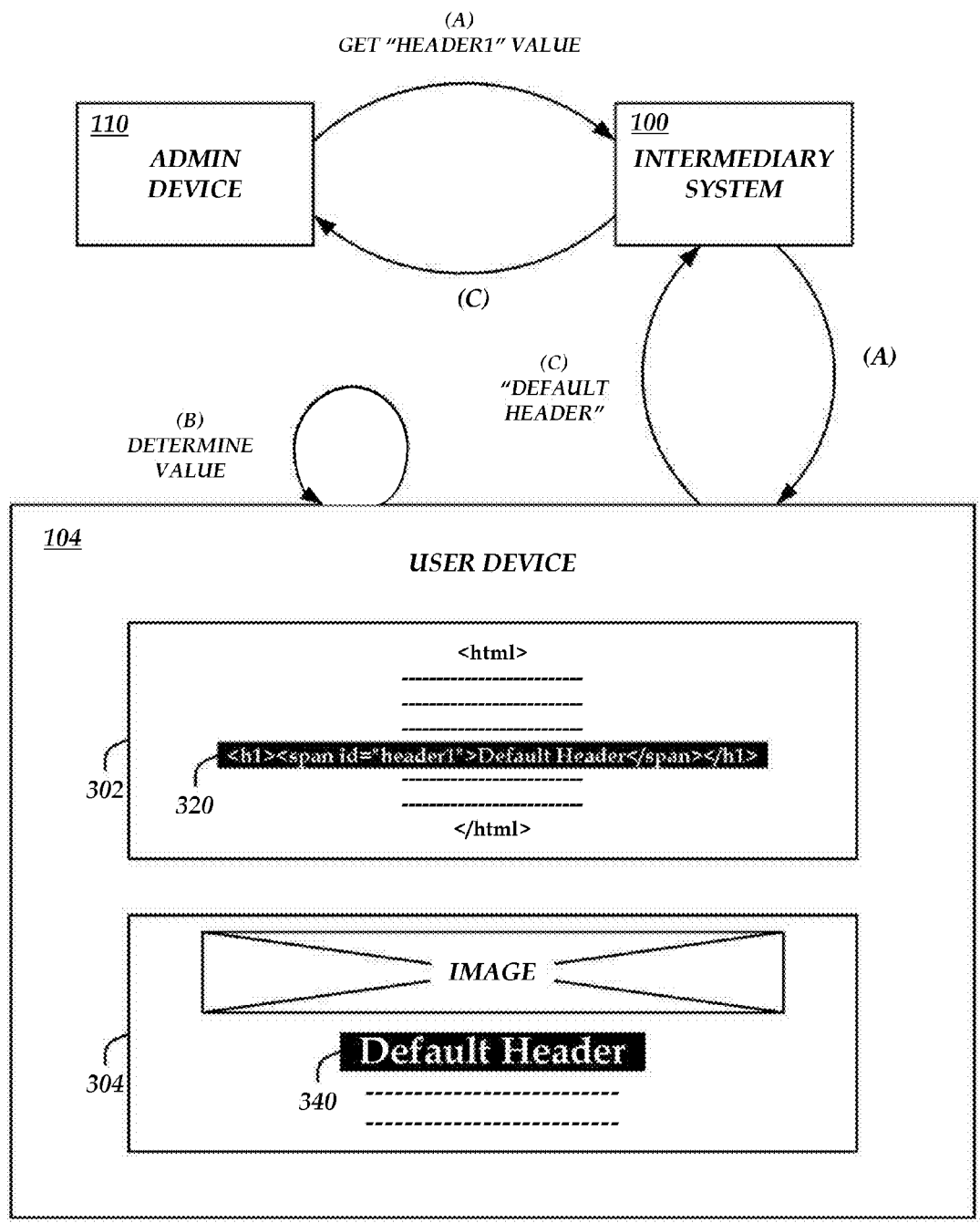
FIG. 3 is a block diagram of an illustrative interaction between an administrator computing device and a remote user computing device.

FIG. 3 shows illustrative communications and data flows between an administrator device 110, an intermediary system 100, and a user device 104 that may occur when an administrator device 110 requests information from the user device 104. At (A), the administrator device 110 may transmit a request to get the current value of the "header1" element from the user device 104. As seen in FIG. 3, the user device 104 is currently displaying a content page 304 corresponding to an HTML file 302. The HTML file 302 includes an element 320 named "header1" with the value "Default Header." The display of the content page 304 includes text 340 "Default Header" that corresponds to the element 320 in the HTML file 302. The user device 104 can determine the that the referenced element 320 has the value "Default Header" at (B), and can transmit that value back to the administrator device 110 via intermediary system 100 at (C)

At decision block 216, the user device 104 can determine whether the communication received from the administrator device 110 is an instruction to modify the DOM of the current page. If not, the process 200 can proceed to block 220. If the communication is an instruction to modify the DOM, the user device 104 can modify the DOM accordingly at block 218. For example, a user of the administrator device 110 may wish to alter the appearance of the currently displayed content page by displaying the text "Test Header" rather than "Default Header" in the "header1" element. The administrator device 110 may transmit a communication instructing the user device 104 to alter the value of the "header1" element. Upon receipt of the communication, a routine defined in the downloaded code file may be invoked as an event handler to execute the instruction.

Figure 4:
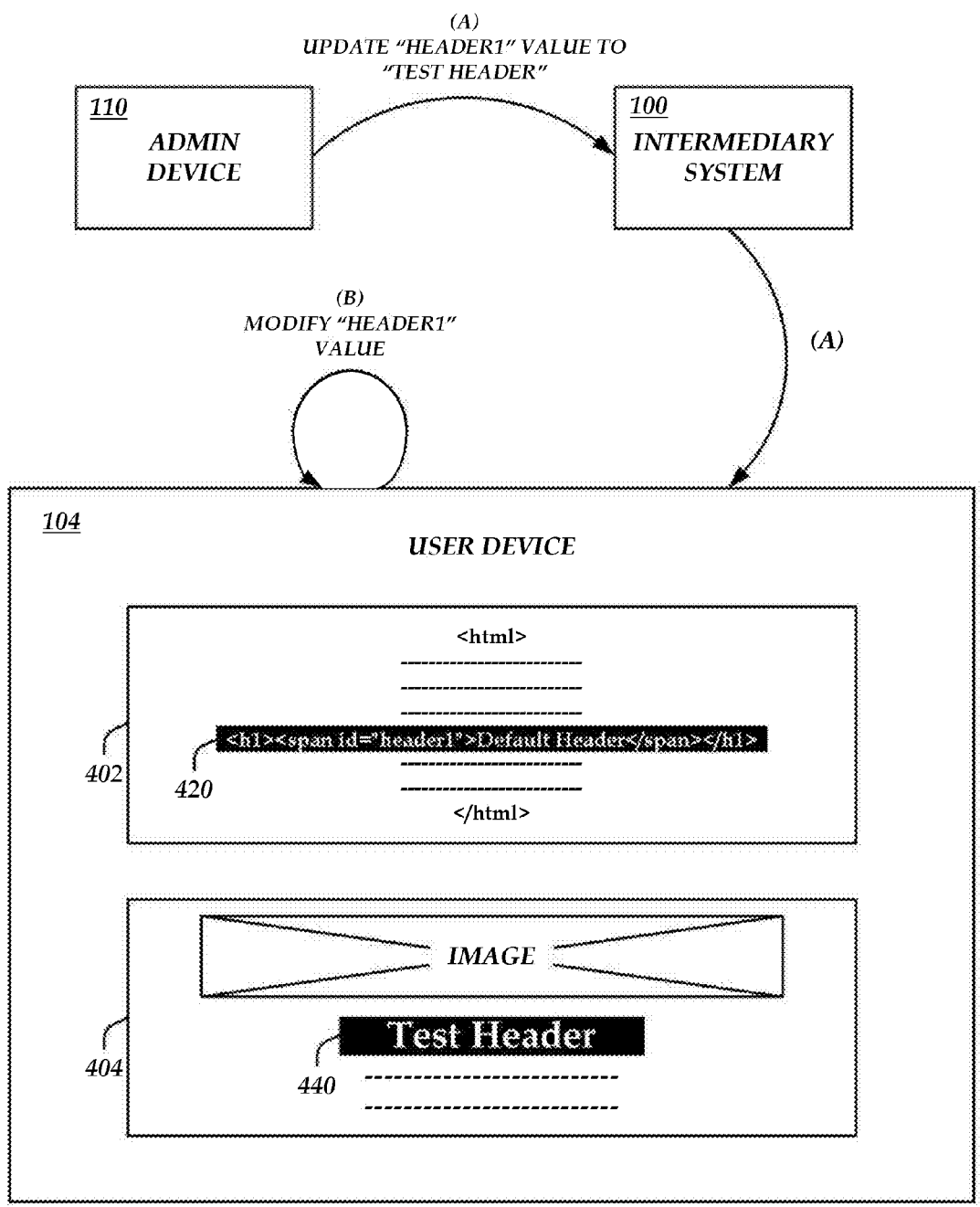
FIG. 4 is a block diagram of another illustrative interaction between an administrator computing device and a remote user computing device.

FIG. 4 shows illustrative communications and data flows between an administrator device 110, an intermediary system 100, and a user device 104 that may occur when an administrator device 110 alters the DOM of a content page on a user device 104. As seen in FIG. 4, the user device 104 has loaded an HTML file 402 with a "header1" element 420 that has a value of "Default Header." The administrator device 110 can transmit an instruction to the user device 104 via the intermediary system 100 at (A) to modify the value of the element 420. The user device 104 can modify the value on the display of the content page 404 such that the text 440 corresponding to the "header1" element 420 shows the new value "Test Header," as instructed by the administrator device 110, rather than the value "Default Header," as originally defined in the HTML file 402.

At block 218 the user device 104 can determine whether the communication received from the administrator device 110 includes executable code rather than a query or instruction to modify the DOM of the current content page. If not, the process 200 can return to block 210 to wait for another communication, or some other process can be executed to determine the nature of the communication or report an error to the administrator device 110 and/or user of the user device 104. If the communication is executable code, the user device 104 can execute the code at block 220. For example, a user of the administrator device 110 may wish to display an alert on the user device 104. The administrator device 110 may transmit a communication with executable code to display such an alert. Upon receipt of the communication, a routine defined in the downloaded code file may be invoked as an event handler to execute the code.

Figure 5:
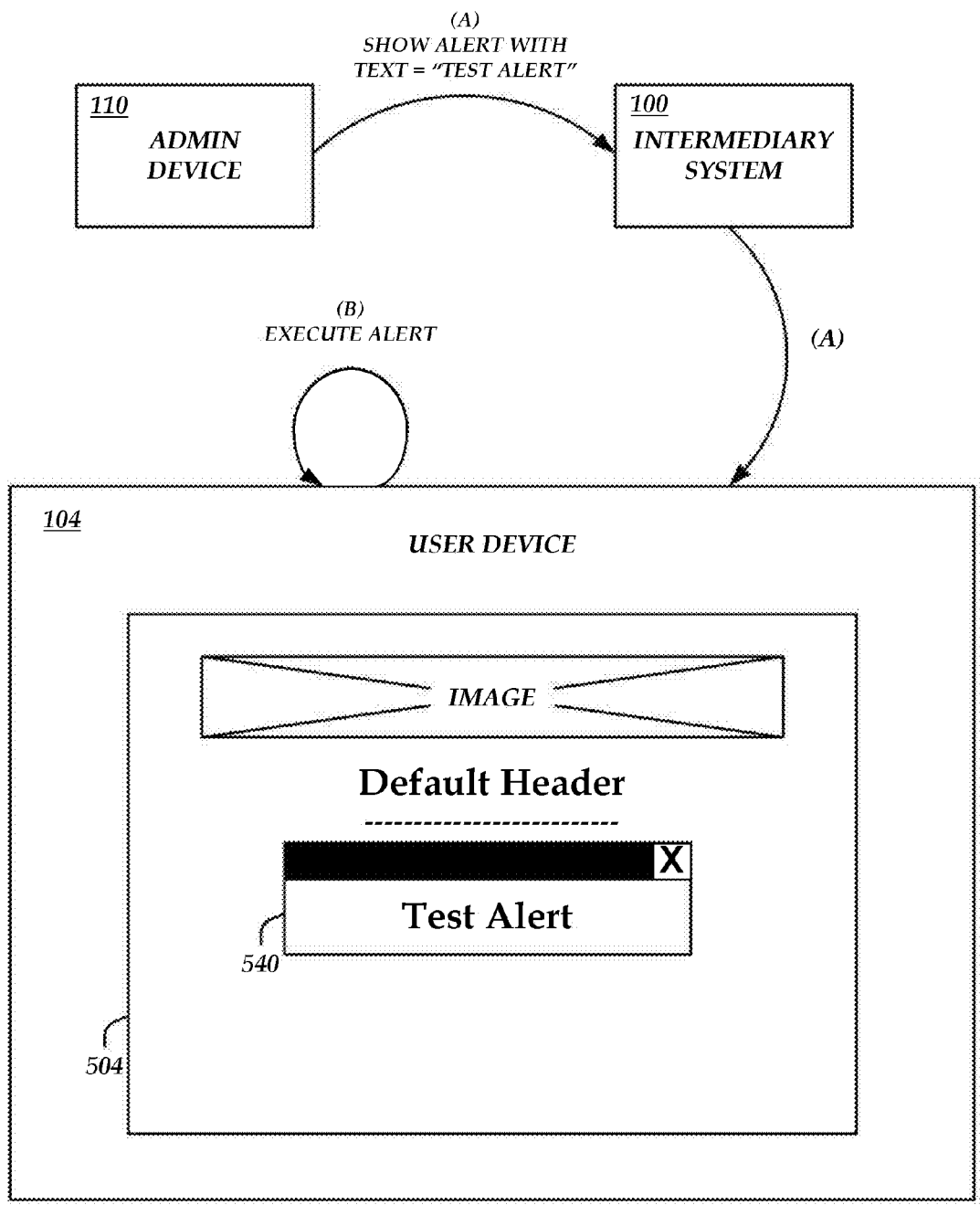
FIG. 5 is a block diagram of another illustrative interaction between an administrator computing device and a remote user computing device.

FIG. 5 shows illustrative communications and data flows between an administrator device 110, an intermediary system 100, and a user device 104 that may occur when an administrator device 110 submits executable code to the user device 104. As seen in FIG. 5, the user device 104 is displaying a content page 502. The administrator device 102 can transmit an instruction to the client device 104 via the intermediary system 100 at (A) to display an alert with the text "Test Alert." The user device 104 executes the instruction at (B), displaying an alert 520 to the user of the user device 104.

In some embodiments, the portions of the process 200 described above, or some variant thereof, may be executed many times (e.g., hundreds of times in a minute) at the initiation of the administrator device 110. For example, a user of the administrator device 110 may execute a debugging application which provides a view of the HTML file currently loaded on the client device. A user may highlight portions of text on the HTML, modify the text, copy/paste text from one portion of the HTML file to other, etc. Each of these actions on the administrator device 110 may result in a corresponding action on the user device 104, such as highlighting an element on the user device 104 corresponding to a portion of text highlighted on the administrator device 110, providing state information regarding an element of content on the user device 104 that corresponds to an element highlighted on the administrator device 110, dynamically updating the display of the page on the user device when portions of HTML are moved around on the administrator device 110, etc. Each of these operations may involve multiple instructions to execute routines and other code on the user device 104.

Process for Debugging Multiple Remote Devices

Figure 6:
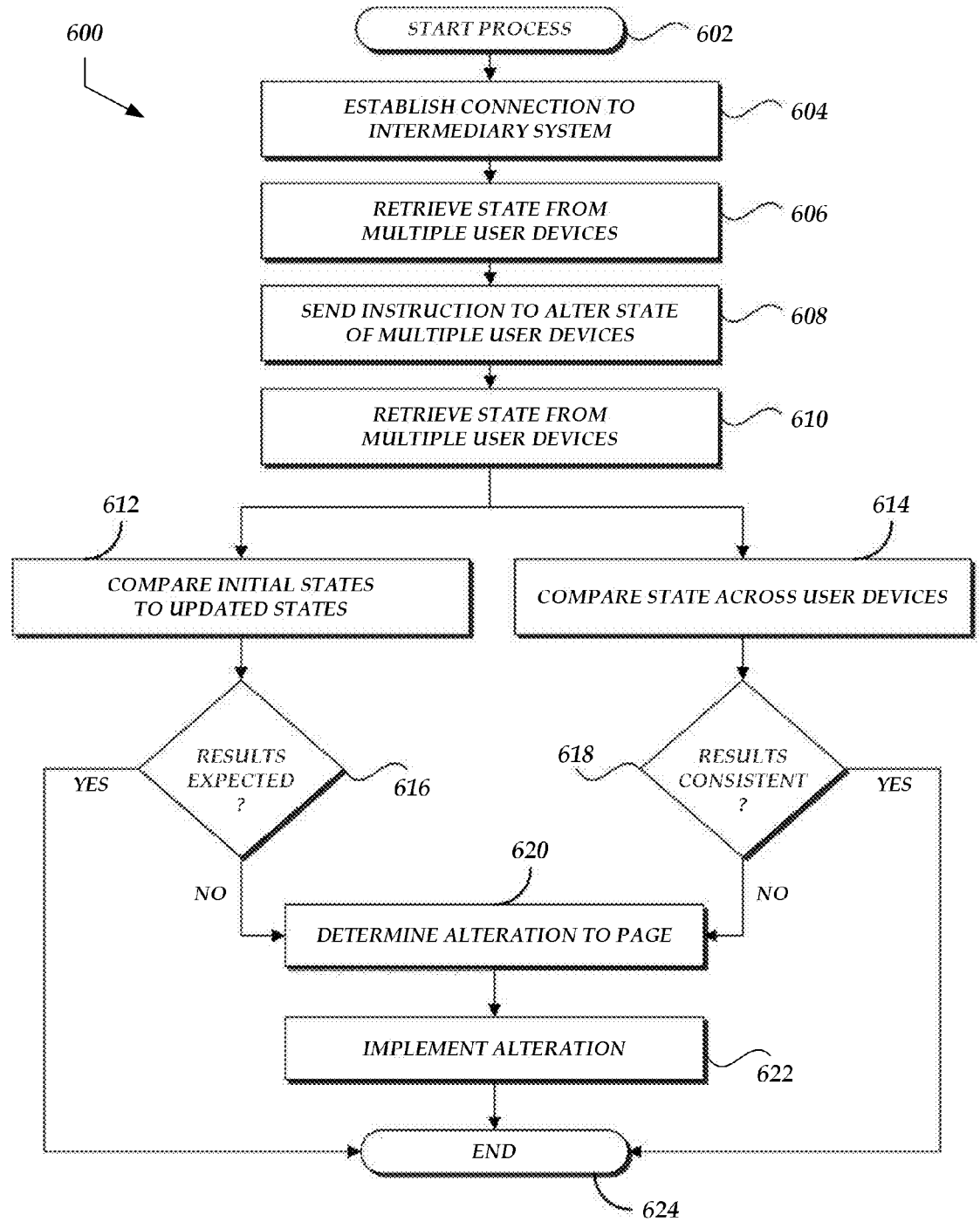
FIG. 6 is a flow diagram of an illustrative process for debugging multiple remote user computing devices from a single administrator computing device.

Turning now to FIG. 6, a sample process 600 for accessing the content state and debugging content on multiple remote devices is shown. A user of an administrator device 110 may query or otherwise request information from each of the multiple remote devices, instruct the multiple remote devices to modify the DOM of a currently displayed content page, execute other instructions, and the like. Advantageously, by performing such operations on multiple devices, a user or automated component may compare results from the multiple devices to identify differences in the way content is rendered on different devices, differences in the way content responds to DOM modifications on different devices, etc. Alternations to the content may then be implemented, and the alterations can be tested on the multiple remote devices to determine their effect. The process 600 may be performed recursively or iteratively until satisfactory results are obtained.

The process 600 begins at block 602. The process 600 may be initiated when a user launches a program on an administrator device 110, debugging device, or some other computing device. Although the description which follows focuses on operations performed on or in conjunction with an administrator computing device 110, the same process 600 or another similar process may used with other types of computing devices, including but not limited to intermediary systems 110, user computing devices 104-108, and the like. The description which follows also focuses operations initiated by a user of the administrator computing device 110. However, such operations may be automatically performed without user interaction, such as according to a test script or at the initiation of an automated testing component.

At block 604, the administrator device 110 can establish a connection to an intermediary system 100. The connection may be established using a bidirectional communication protocol, such as WebSocket. One or more user devices 104-108 may have previously established connections to the same intermediary system 100, or they may subsequently do so. For convenience, the various user devices 104-108 may be associated with each other as a group or subgroup of user devices. The association of user devices into a particular group may be managed by the intermediary system 100, the administrator device 110, or the user devices 104-108 themselves. For example, the user devices 104-108 may download and execute code to establish a connection with the intermediary system 100, as described above. The code may also include an instruction to register the user devices 104-108 at the intermediary system 100 with a particular group (e.g., an executable routine "setgroup(name)," executed by the individual user devices 104-108 in conjunction with the intermediary system 100, that associates each user device 104-108 with a group identified by the "name" parameter). The administrator device 110 may then address the entire group of user devices 104-108 with a single communications rather than individual user devices 104-108. In some embodiments, the administrator device 110 may not initially know which user devices 104-108, if any, are members of the group. In some embodiments, the administrator device 110 may transmit communications to individual user devices instead of, or in addition to, the entire group.

At block 606, the administrator device 110 can retrieve data regarding the content state from multiple user devices 104-108. For example, a user of the administrator device 110 may wish to test how a particular content item, such as a web page developed by the user and currently rendered on various user devices 104-108, responds to an instruction to perform some action, such as activation of a command button. The user of the administrator device 110 may first query the initial state of the content page on each user device 104-108 so that the user, or some automated process, may be able to determine how the state on each user device 104-108 changes after performance of the action to be tested.

Each user device 104-108 may be configured differently, thereby providing the administrator device 110 with the opportunity to test the action under a variety of circumstances. As illustrated in FIG. 1, one user device may be a tablet 104, one user device may be a laptop computer 106, and one user device may be a mobile phone 108. In some embodiments, the user devices 104-108 may all be examples of the same physical user device (e.g., three tablet computers) configured with different operating systems, web browser applications, configuration settings, execution parameters, etc. In some embodiments, some combination of different user devices with similar software configurations and similar user devices with different software configurations may be used. In this way, a single application or content item may be tested across the entire spectrum of anticipated operating environments regardless of, e.g., which hardware or software are included in the target user devices.

At block 608, the administrator device 110 may send an instruction altering the content state on the user devices 104-108. In the present example, the instruction may result in activation of a particular command button. The user devices 104-108 can receive and execute the instruction as described above.

At block 610, the administrator device 110 can retrieve data regarding the content state from multiple user devices 104-108. In the present example, administrator device 110 may query the current state of the content page on each user device 104-108 after execution of the instruction sent in block 608 so that the user, or some automated process, may be able to determine how the state on each user device 104-108 has changed from the initial state obtained in block 606. From block 610, the process 600 may proceed to bock 612 in order to compare the initial states to the updated states on each device, and/or to block 614 to compare initial and/or current states across the devices.

At block 612, the initial content state of a particular user device 104-108 may be compared to the updated content state of the user device. In the present example, the user of the administrator device 110 may be testing whether an initially hidden element is shown after activation of a command button. The initial content state, as retrieved in block 606, may indicate that the element is hidden on the particular user device. This content state can be compared against the updated content state, retrieved in block 610 after activation of the command button. In the present example, the content state may indicate that the particular element is still hidden. At decision block 616, the administrator device 110 can determine that the result is not what was expected or is not desirable, and the process 600 can proceed to block 620 where the administrator device 110 determines an alteration to the page based on the results of the test. For example, an alteration may be identified that will result in the correct change of state in response to activation of the command button on the particular user device. If the result is what was expected or desired (e.g., if the element is now visible), the process 600 may terminate at block 624 for this particular user device. Blocks 612 and 616 may be repeated for each user device 104-108.

At block 614, the administrator device 110 can compare the states of user devices 104-108 to each other. For example, the administrator device 110 can compare the initial content states of the user devices 104-108, or the updated content states of the user devices 104-108 after command button was activated. At decision block 618, the administrator device 110 can determine whether the initial and/or updated content states were consistent across user devices 104-108. If the content states of different user devices 104-108 were different, either before or after activation of the command button, the administrator device 110 can proceed to block 620 to determine an alteration to the content page intended to produce consistent results across user device 104-108.

At block 622, the alteration(s) determined in block 620 may be implemented. For example, the content page that was tested may be altered. The process 600 may then terminate at block 624. In some embodiments, the process 600 may then return to block 606, where the test or some variant thereof is repeated to determine the effect of the alterations.

The process 600 described above is illustrative only, and is not intended to be limiting. The same process 600 or a different process may be used to monitor/test/debug content across multiple remote computing devices. In some cases, the sequence of events may not include, e.g., execution of an instruction to activate a particular element. Rather, the sequence may involve passive monitoring of content state over a period of time, identification of changes in program state in response to other actions (e.g., activation of various user interface features, or execution of code), some combination thereof, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by one or more processors or computing devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, the processes described with respect to FIGS. 2 and 6 may be embodied in a set of executable program instructions stored on a computer-readable medium, such as one or more disk drives, of the computing system with which the intermediary system is associated. When the processes are initiated, the executable program instructions can be loaded into memory, such as RAM, and executed by one or more processors of the computing system. In some embodiments, the computing system may include multiple computing devices, such as servers, and the process may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for debugging content on a remote user computing device, the system comprising:
   a data store configured to store computer-executable instructions; and
   a computing device in communication with the data store, the computing device, when executing the computer-executable instructions, configured to:
      transmit, to a remote user computing device separate from the computing device, a code file comprising:
         an instruction to establish, using a bidirectional communication protocol, a network connection with an intermediary system separate from the computing device and the remote user computing device, wherein the bidirectional communication protocol permits the intermediary system to send communications to the remote user computing device without first receiving a request for the communications, and wherein the remote user computing device executes the instruction to establish the network connection with the intermediary system using the bidirectional communication protocol; and
         one or more routines for accessing a current state of a content page rendered on the remote user computing device;
      transmit, to the remote user computing device via the network connection with the intermediary system, a debugging instruction to be processed by at least one of the one or more routines; and
      receive, from the remote user computing device via the network connection with the intermediary system, a response regarding the current state of the content page after processing the debugging instruction.

2. The system of claim 1, wherein the bidirectional communication protocol comprises Web Socket.

3. The system of claim 1, wherein the intermediary system is separate from a content server associated with the content page.

4. The system of claim 1, wherein a routine of the one or more routines comprises one of: obtaining a value of an element of the content page; altering the value of the element of the content page; and executing code received in the debugging instruction.

5. The system of claim 1, wherein the computing device is further configured to determine a modification to the content page based at least partly on the response.

6. A computer-implemented method for obtaining access to content state on a remote user device, the computer-implemented method comprising:
   under control of one or more computing devices configured with specific computer-executable instructions,
      establishing, with an intermediary system separate from the one or more computing devices, a first network connection, wherein the intermediary system is in communication with a remote user computing device via a second network connection using a bidirectional communication protocol that permits the intermediary system to send communications to the remote user computing device without first receiving a request for the communications from the remote user computing device;
      transmitting, via the intermediary system, an instruction to the remote user device;
      receiving, via the intermediary system, state data regarding a state of a content item, rendered on the remote user device, after processing of the instruction.

7. The computer-implemented method of claim 6, wherein the bidirectional communication protocol comprises Web Socket.

8. The computer-implemented method of claim 6, wherein the instruction causes the remote user device to modify the state of the content item.

9. The computer-implemented method of claim 8, wherein modifying the state of the content item comprises modifying a document object model ("DOM") of the content item.

10. The computer-implemented method of claim 6, further comprising transmitting, to the remote user device, an instruction to establish the second network connection, using the bidirectional communication protocol, to the intermediary system.

11. The computer-implemented method of claim 6, further comprising transmitting, to the remote user device, a code file comprising one or more routines for accessing a current state of the content item.

12. The computer-implemented method of claim 6, further comprising determining, based at least partly on the state data, a modification to the content.

13. The computer-implemented method of claim 6, further comprising:
   selecting a plurality of remote user devices based at least partly on a configuration characteristic of each of the plurality of remote user devices, wherein the remote user device is one of the plurality of remote user devices; and
   transmitting, to each of the plurality of remote user devices, an instruction to establish a respective network connection with the intermediary system using the bidirectional communication protocol.

14. The computer-implemented method of claim 13, wherein the configuration characteristic relates to one of a hardware component and a software module of each of the plurality of remote user devices.

15. The computer-implemented method of claim 13, further comprising:
   transmitting, via the intermediary system, an instruction to each of the plurality of remote user devices; and receiving, via the intermediary system, state data regarding a state of a content item rendered on each of the plurality of remote user devices.

16. The computer-implemented method of claim 6, wherein the instruction comprises a debugging instruction.

17. A computer-implemented method for providing remote access to content state, the computer-implemented method comprising:
   under control of a computing device configured with specific computer-executable instructions,
      establishing a network connection to a remote system, wherein the network connection is established using a bidirectional communication protocol that permits the remote system to send communications to the computing device without first receiving a request for the communications from the computing device;
      receiving, via the network connection, an instruction to modify a state of a rendered content item; and
      in response to receiving the instruction, modifying the state of the content item based at least in part on the instruction.

18. The computer-implemented method of claim 17, wherein the bidirectional communication protocol comprises WebSocket.

19. The computer-implemented method of claim 17, wherein modifying the state of the content item comprises modifying a Document Object Model ("DOM") of the content item.

20. The computer-implemented method of claim 17, wherein the instruction comprises executable code, and wherein modifying the state of the content item comprises executing the executable code of the instruction.

21. The computer-implemented method of claim 17, further comprising transmitting, via the network connection, data regarding the modified state.

22. The computer-implemented method of claim 17, further comprising receiving a code file from a server, the code file comprising:
   an instruction to establish the network connection with the remote system; and
   one or more routines for accessing a current state of the content item.

23. The computer-implemented method of claim 22, wherein modifying the state of the content item comprises executing a routine of the one or more routines.

24. The computer-implemented method of claim 22, wherein the server is separate from the remote system.

25. The computer-implemented method of claim 22, further comprising activating a bookmarklet, the bookmarklet comprising an instruction to retrieve the code file from the server.

26. The computer-implemented method of claim 17, further comprising activating a bookmarklet, the bookmarklet comprising an instruction to open the network connection to the remote system.

27. The computer-implemented method of claim 17, wherein the instruction is received, via the network connection with the remote system, from a computing device separate from the remote system.

28. The computer-implemented method of claim 17, wherein the remote system is not associated with the content page.

29. The computer-implemented method of claim 17, further comprising identifying, with the remote system, the computing device as part of a group of computing devices.

30. The computer-implemented method of claim 17, wherein the instruction comprises a debugging instruction.

* * * * *